US008825259B1

(12) United States Patent
Ferguson

(10) Patent No.: US 8,825,259 B1
(45) Date of Patent: Sep. 2, 2014

(54) DETECTING LANE CLOSURES AND LANE SHIFTS BY AN AUTONOMOUS VEHICLE

(71) Applicant: Google Inc., Mountain View, CA (US)

(72) Inventor: David I. Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/923,743

(22) Filed: Jun. 21, 2013

(51) Int. Cl.
*G06F 19/00* (2011.01)
*G05D 1/02* (2006.01)
*G01S 13/93* (2006.01)

(52) U.S. Cl.
CPC ............ *G05D 1/0214* (2013.01); *G05D 1/0272* (2013.01); *G05D 1/0278* (2013.01); *G05D 1/027* (2013.01); *G01S 2013/936* (2013.01); *G05D 1/0227* (2013.01)
USPC ............. 701/23; 701/117; 701/300; 701/301; 701/468; 701/469; 180/167; 180/168; 180/169; 104/124; 104/130.07; 104/139; 104/298; 104/299; 340/435; 340/436; 340/438; 340/901; 340/903; 342/42; 342/46; 342/70; 342/71; 342/457

(58) Field of Classification Search
CPC ... G05D 1/0272; G05D 1/0227; G05D 1/027; G05D 1/0278; G01S 2013/936
USPC ......... 701/1, 3, 20, 23, 24, 25, 28, 36, 41, 50, 701/96, 117, 300, 301, 468, 469, 470; 104/31, 48, 88.04, 124, 130.07, 139, 104/298, 299, 300; 340/435, 436, 438, 901, 340/903, 905, 935, 942, 988; 342/42, 46, 342/70, 71, 357.31, 457; 180/167, 168, 180/169; 414/228, 537; 367/909
See application file for complete search history.

(56) References Cited

U.S. PATENT DOCUMENTS 5,208,750 A * 5/1993 Kurami et al. .................. 701/28
6,032,097 A * 2/2000 Iihoshi et al. ................... 701/96
6,275,773 B1 * 8/2001 Lemelson et al. ............ 701/301
6,292,725 B1 * 9/2001 Kageyama et al. ............. 701/23
6,574,536 B1 * 6/2003 Kawagoe et al. ............... 701/23
7,778,753 B2 * 8/2010 Fujiwara et al. ................ 701/41
8,311,730 B2 11/2012 Neff
2008/0303696 A1 * 12/2008 Aso et al. ...................... 340/935
2010/0104199 A1 4/2010 Zhang et al.
2013/0057397 A1 3/2013 Cutler et al.
2013/0060414 A1 3/2013 Lee et al.

* cited by examiner

*Primary Examiner* — McDieunel Marc
(74) *Attorney, Agent, or Firm* — McDonnell Boehnen Hulbert & Berghoff LLP

(57) ABSTRACT

In an example implementation, an autonomous vehicle is configured to detect closures and lane shifts in a lane of travel. The vehicle is configured to operate in an autonomous mode and determine a presence of an obstacle substantially positioned in a lane of travel of the vehicle using a sensor. The lane of travel has a first side, a second side, and a center, and the obstacle is substantially positioned on the first side. The autonomous vehicle includes a computer system. The computer system determines a lateral distance between the obstacle and the center, compares the lateral distance to a pre-determined threshold, and provides instructions to control the autonomous vehicle based on the comparison.

20 Claims, 8 Drawing Sheets

200 204 202 208 206
Right Side View 202 210 208 206
Front View 202 204 LICENSE
Back View 208 202 204
Top View

DETECTING LANE CLOSURES AND LANE SHIFTS BY AN AUTONOMOUS VEHICLE

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

Within examples, methods and systems are provided for detecting lane closures and lane shifts by an autonomous vehicle.

In a first aspect a method is provided. The method includes determining, using at least one sensor of an autonomous vehicle, a presence of an obstacle substantially positioned in a lane of travel of the autonomous vehicle. The lane of travel may have a first side, a second side, and a center, and the obstacle may be substantially positioned on the first side. The method also includes determining, using a processor, a lateral distance between the obstacle and the center. The method additionally includes comparing the lateral distance to a pre-determined threshold. The method further includes providing instructions to control the autonomous vehicle based on the comparison.

In a second aspect a vehicle is provided. The vehicle includes a sensor configured to determine a presence of an obstacle substantially positioned in a lane of travel of the vehicle. The vehicle may be configured to operate in an autonomous mode in the lane of travel, and the lane of travel may have a first side, a second side, and a center. The obstacle may be substantially positioned on the first side. The vehicle also includes a computer system. The computer system may be configured to determine a lateral distance between the obstacle and the center, compare the lateral distance to a pre-determined threshold, and provide instructions to control the autonomous vehicle based on the comparison.

In a third aspect, a non-transitory computer readable medium having stored therein instructions that when executed by a computer system in an autonomous vehicle, cause the computer system to perform functions is disclosed. The functions include determining, using at least one sensor of the vehicle, a presence of an obstacle substantially positioned in a lane of travel of the autonomous vehicle. The lane of travel may have a first side, a second side, and a center. The obstacle may be substantially positioned on the first side. The functions also include determining, using a processor, a lateral distance between the obstacle and the center. The functions additionally include comparing the lateral distance to a pre-determined threshold. The functions further include providing instructions to control the autonomous vehicle based on the comparison.

In a fourth aspect a system is provided. The system includes a means for determining a presence of an obstacle substantially positioned in a lane of travel of the autonomous vehicle. The lane of travel may have a first side, a second side, and a center, and the obstacle may be substantially positioned on the first side. The system also includes a means for determining a lateral distance between the obstacle and the center. The system additionally includes a means for comparing the lateral distance to a pre-determined threshold. The system further includes a means for providing instructions to control the autonomous vehicle based on the comparison.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
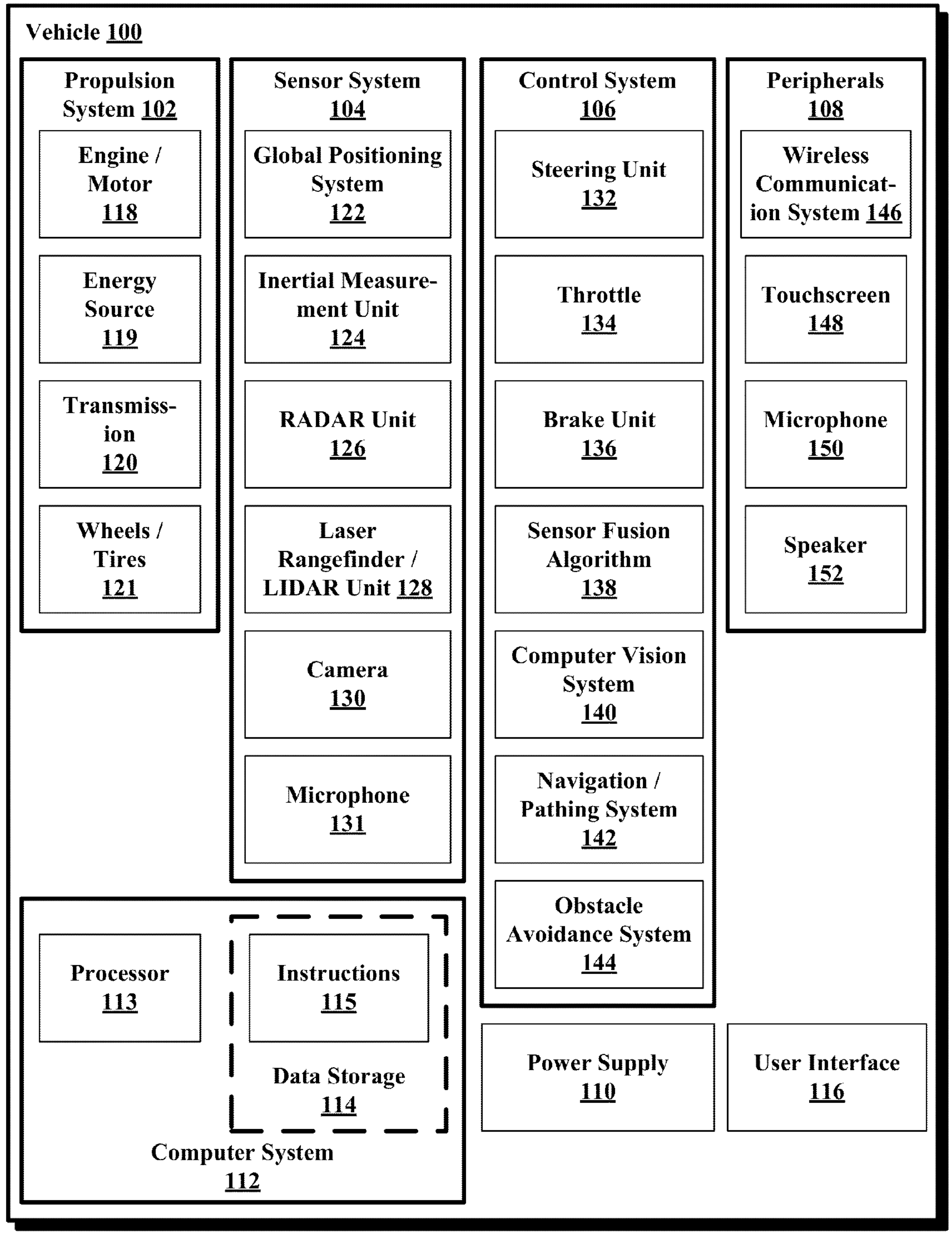
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, knowing or recognizing the presence of objects in a current lane of the vehicle may be helpful. Roads experiencing construction, for example, may include lanes that are blocked off with objects (e.g., with cones, k-rails, etc.) thereby preventing traffic from advancing in the blocked off lanes. Similarly, objects may be used to shift a lane (e.g., placing cones on each side of the lane) thereby indicating a new route for the lane. Autonomous vehicles may need to detect such lane closures/blockages and shifts to safely navigate through a construction zone or other circumstance that may cause such closures or diversions.

Within examples, an autonomous vehicle is provided that is configured to determine when a lane is closed off with obstacles, determine when a lane is shifted by obstacles, and to differentiate between the two circumstances. More specifically, disclosed embodiments generally relate to systems and methods for (i) determining whether a lane of travel is blocked off with an obstacle by measuring a distance of the obstacle from a center point of the lane in which the obstacle is present and comparing it to a safe threshold (e.g., the width of the vehicle divided by two plus a pre-determined buffer) and (ii) determining whether obstacles are being used to shift a lane by measuring various distances of the obstacles from various center points of the lane in which the obstacles are present and comparing an absolute difference in the distances to a threshold (e.g., the width of the lane divided by two).

For example, an autonomous vehicle may be driving in a leftmost lane of a three-lane highway and may perceive, using a perception system (e.g., LIDAR, RADAR, or a camera), four imminent cones in the lane. All four cones, for example, may be substantially positioned on a left portion of the lane. Using the methods noted above, the vehicle may iteratively process each obstacle to estimate whether there is sufficient space for a driving lane given the constraints imposed by the particular obstacle. In this example, the vehicle may determine that there is not sufficient space to safely pass by the second cone, and may stop operating in the lane (e.g., come to a stop or change lanes).

In an alternative embodiment, two of the cones, of the four mentioned above, may be substantially positioned on a right portion of the lane and the remaining two cones may be substantially positioned on a left portion of the lane. Similar to the first example, using the methods noted above, the vehicle may determine whether a distance between the cones is large enough for driving. Upon iteratively processing all of the cones, the vehicle may determine that enough driving room remains, and may thereby determine that the lane has been shifted. Based on this determination, the vehicle may continue to operate in a manner that allows the vehicle to safely pass through the cones.

Utilizing the methods and systems described herein may allow autonomous vehicles to determine whether or not a lane (or road) has been closed/blocked or shifted in an efficient, accurate, and robust manner.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/ or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
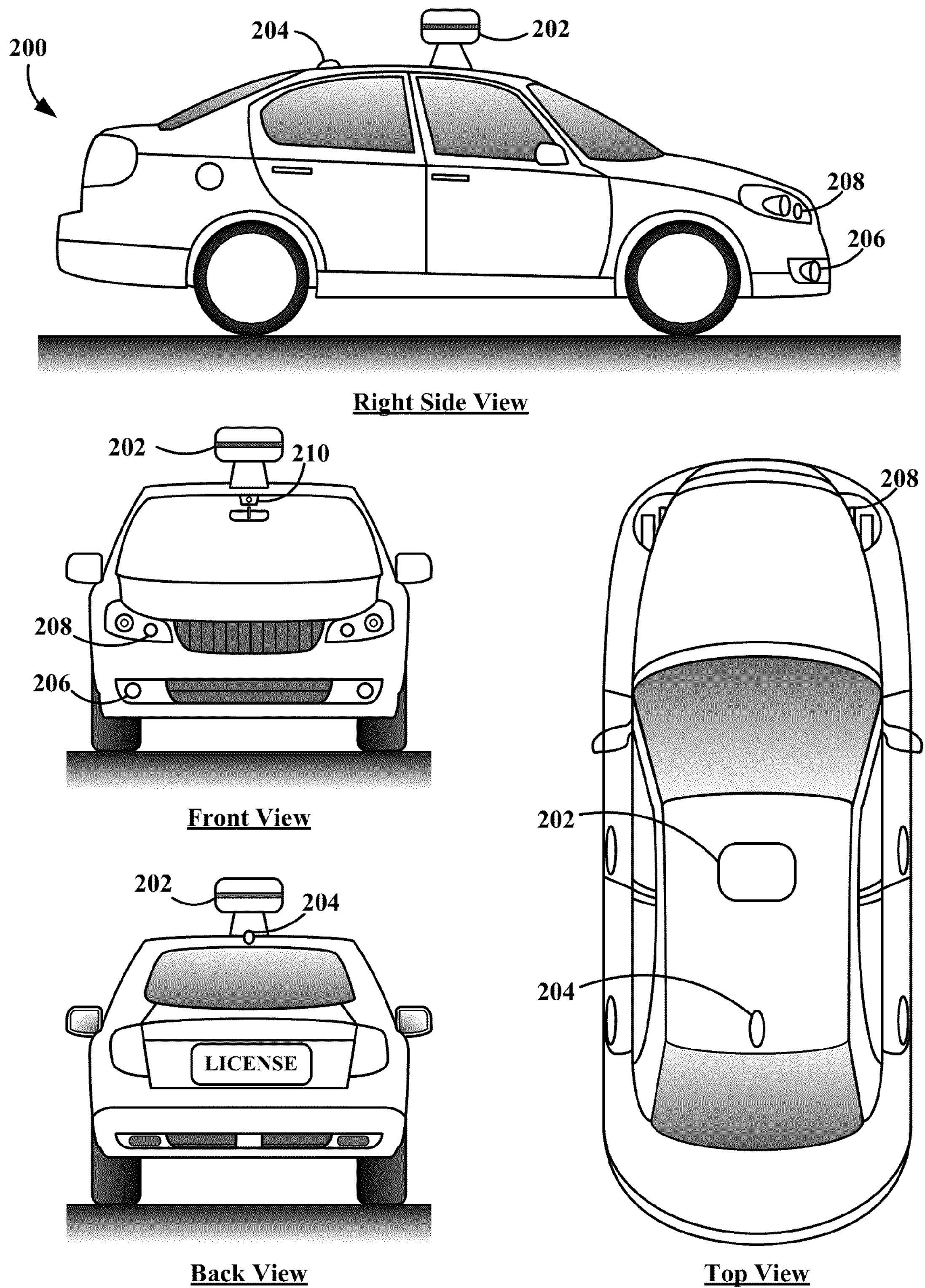
FIG. 2 is a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3A:
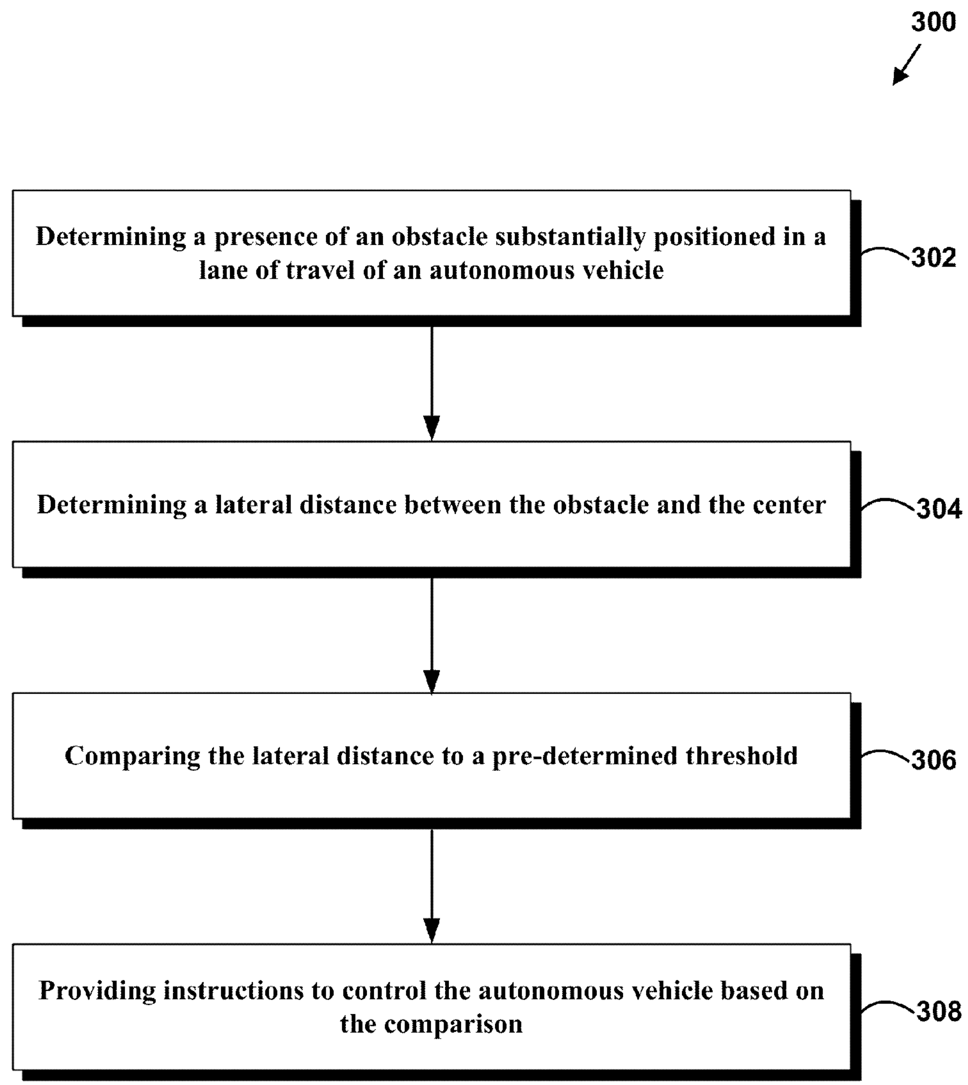
FIG. 3A illustrates a block diagram of a method, in accordance with an example embodiment.

In FIG. 3A, a method 300 is provided for detecting lane closures and lane shifts by an autonomous vehicle. The vehicle described in this method may be vehicle 100 and/or vehicle 200 as illustrated and described in reference to FIGS. 1 and 2, respectively. For example, the processes described herein may be carried out by LIDAR Unit 128 and/or RADAR Unit 126 mounted to an autonomous vehicle (e.g., vehicle 200) in communication with computer system 112, sensor fusion algorithm 138, and/or the computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to the computer system 112 and/or a computer program product 500 described below), for example, such as a storage device including a disk or hard drive.

In addition, each block of the flowchart shown in FIG. 3A (or FIG. 3B) may represent circuitry that is wired to perform the specific logical functions in the process. Unless specifically indicated, functions in the flowchart shown in FIGS. 3A-3B may be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure, such as the additional flowchart shown in FIG. 3B.

Initially at block 302, method 300 of FIG. 3A includes determining a presence of an obstacle substantially positioned in a lane of travel. The determination may be made by an autonomous vehicle operating in an environment such as the vehicle described in reference to FIGS. 1 and 2. The environment may be any environment in which the vehicle may operate autonomously in a lane of travel. Such environments may include a highway, a road, or an interstate to name a few. The environments may also include objects, obstacles, or pedestrians that may be positioned on the highway, road, or interstate. In one example, referring to FIG. 4A, a vehicle 404 may be operating in an environment 400 including a road 402 and cone 410. Road 402 may include two lanes 408*a*, 408*b* and each lane may include a left side a right side and a center. The left side and the right side may be defined based on a heading of the vehicle. For example, the left side may correspond to the left side of vehicle 404 when vehicle 404 is operating in a straight north heading, and the right side may correspond to the right side of vehicle 404 when operating in the straight north heading (for purposes of method 300, north corresponds to the Y direction).

As depicted, lane 408*a* may include right side 414*a*, left side 414*b*, and center 412. Note, in FIG. 4A, the left side, right side, and center are not shown for lane 408*b*, but lane 408*b* may include each. Vehicle 404 may be operating in lane 408*a* and positioned substantially (e.g., the majority of the body width of vehicle 404) in the center of lane 408*a*. In other examples vehicle 404 may be positioned substantially on the left side 414*a* or substantially on the right side 414*b*. Vehicle 404 may be positioned in other manners as well. Cone 410 may also be substantially positioned in lane 408*a* and on left side 414*a*. In other examples, cone 410 may be substantially positioned outside of lane 408*a*, but still on let side 414*a*, but may still be relevant to vehicle 404.

While operating in lane 408*a*, vehicle 404 may operate at least one sensor of a sensor unit 406 to determine a presence of an obstacle. For example, vehicle 404 may operate a LIDAR, similar to or the same as LIDAR 128, for example, to determine the presence of cone 410. Other sensors (such as those discussed in reference to FIGS. 1 and 2) may be used to determine the presence of cone 410 as well, and vehicle 404 may employ any of the methods generally known or later developed to detect the presence of cone 410.

Figure 3B:
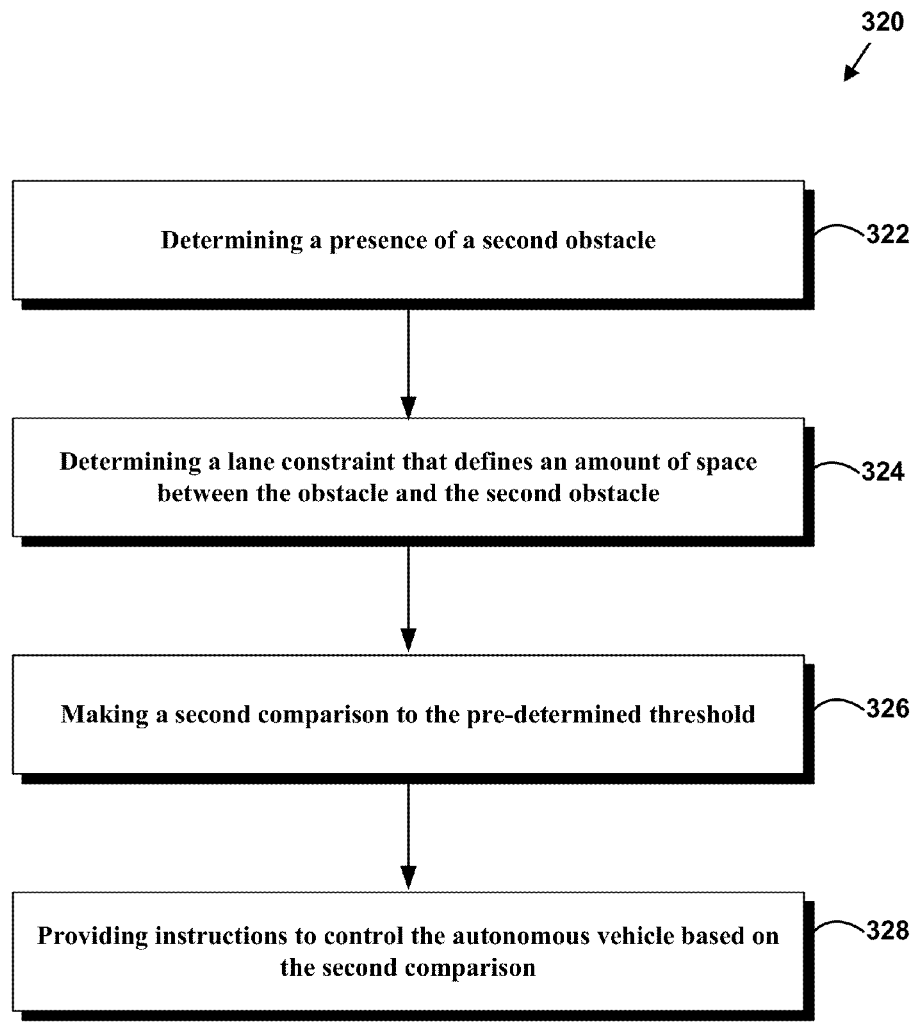
FIG. 3B illustrates another block diagram of a method, in accordance with an example embodiment.
Figure 4A:
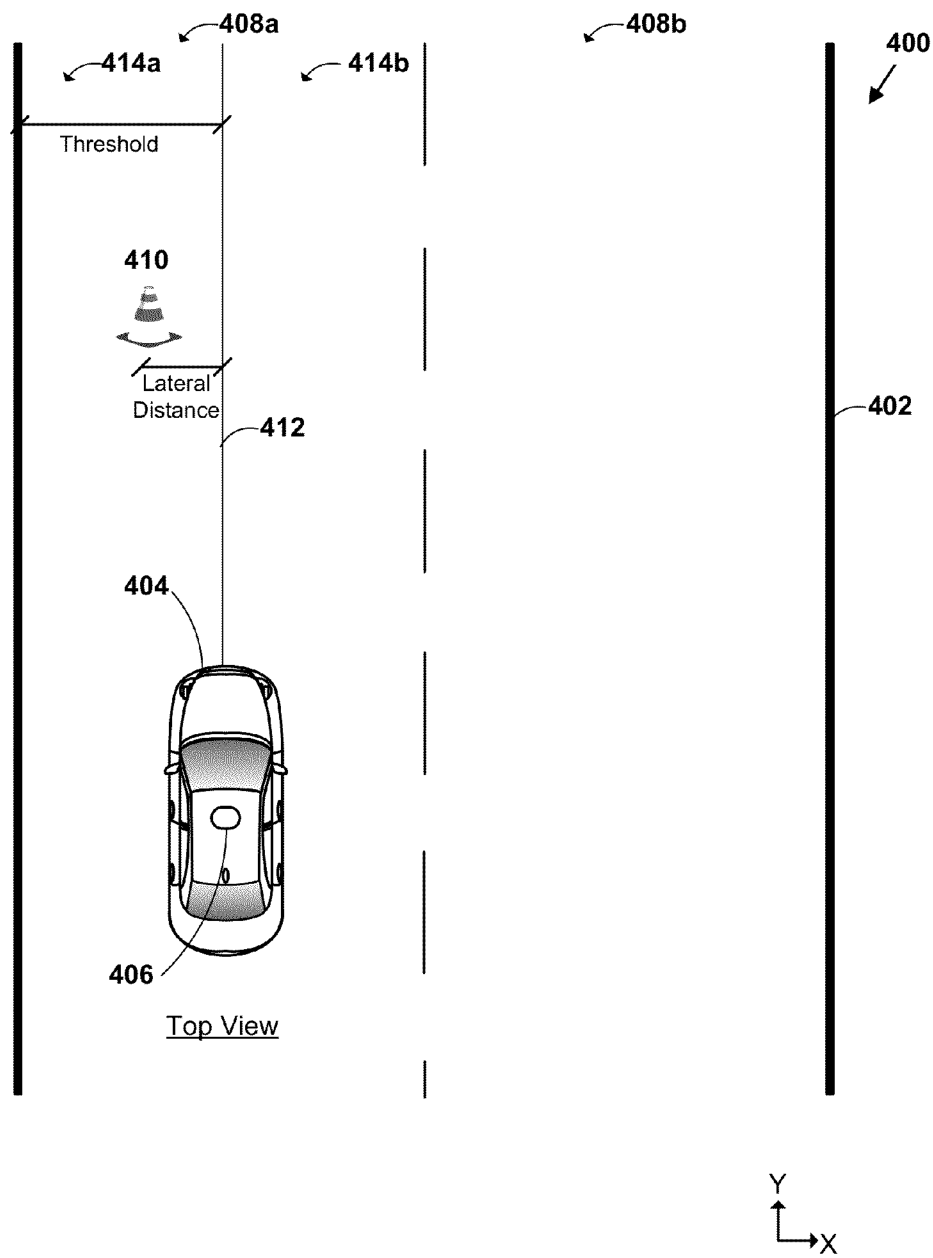
FIG. 4A is a top view of an autonomous vehicle operating scenario, in accordance with an example embodiment.

Referring back to FIG. 3, next at block 304, method 300 includes determining a lateral distance between the obstacle and the center. The obstacle may be the obstacle detected by the vehicle in the previous step, step 302, and may include any of the above noted obstacles. The determination may be made utilizing a sensor system the same as or similar to that discussed above with reference to step 302 along with computer system 112, for example. Using these components, vehicle 404 may construct a set of points that represent center 412 (e.g., shown in FIG. 4B) extending from itself in the direction the vehicle is heading, in FIG. 4A a straight north heading. Using a RADAR, similar to or the same as RADAR Unit 126, vehicle 404 may determine a lateral distance between the obstacle and center 412 by measuring a distance between a point on center 412 and the particular obstacle, in this example cone 410. The point on center 412 may be a point found at a distance from vehicle 404 to the obstacles (e.g., 422, 444 of FIG. 4B). The lateral distance may be defined as a horizontal distance (depicted along the x-axis shown in FIGS. 4A and 4B) from the given point on center 412 to a center point on the particular obstacle. In other examples, the lateral distance may be measured from other points on, or associated, with the particular obstacle. Referring to FIG. 4A, the lateral distance from cone 410 may be measured from a center point between cone 410 to center 412. The distance may be determined, for example, using RADAR Unit 126 of sensor system 104 in combination with computer system 112. Other means may be used to measure the lateral distance as well. In FIG. 4A, the lateral distance from cone 410 to center 412 is demarcated "lateral distance."

Figure 4B:
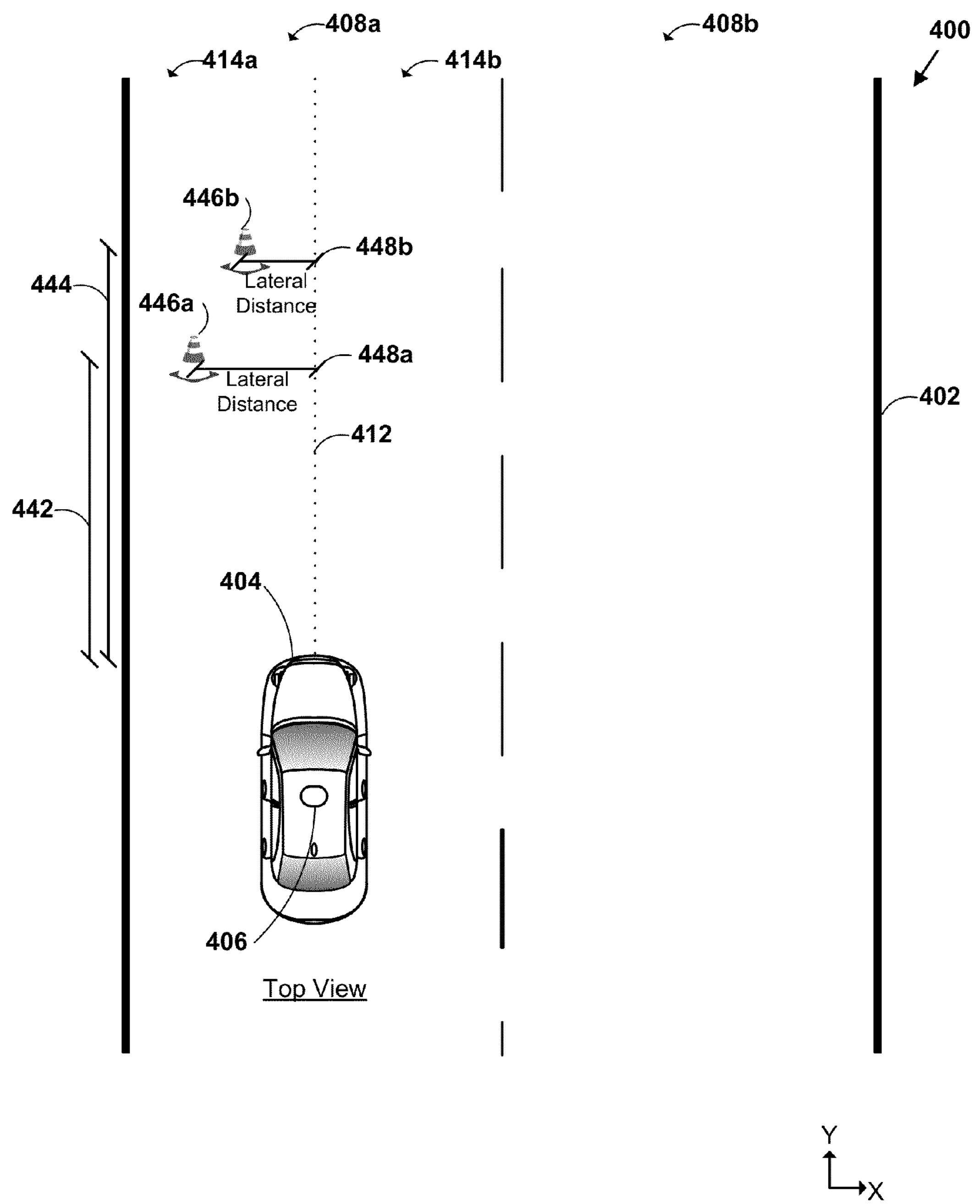
FIG. 4B is another top view of an autonomous vehicle operating scenario, in accordance with an example embodiment.

In some examples, an environment of an autonomous vehicle such as vehicle 404 may include multiple obstacles similar to environment 440 shown in FIG. 4B. In FIG. 4B, two cones, 446*a*, 446*b* are substantially within lane of travel 408*a*. As such, in the environment of FIG. 4B, vehicle 404 may determine a lateral distance between each cone and center 412. In practice, as noted above, vehicle 404 may construct a set of points representing the center of the lane it is traveling in, and based on the center points, vehicle 404 may calculate and index a closest lane distance to each cone and the signed lateral distance of each cone to a respective center point. For example, in FIG. 4B, vehicle 404 may determine a lane distance 442 for cone 446*a*, and a lane distance 444 for cone 446*b*. The lane distance may be measured from the front of vehicle 404 to the center of cones 446*a*, 446*b*, for example. Other points on vehicle 404 and cones 446*a*, 446*b* may be used as long as the measurement remains consistent. Thereafter, vehicle 404 may determine a lateral distance for cones 446*a*, 446*b* starting with cone 446*a* that has a smaller lane distance 442 than cone 446*b* with a larger lane distance 444. In other examples, vehicle 404 may determine the lateral distance for each cone 446*a*, 446*b* starting with the cone with a larger lane distance. The lateral distances may be determined using the methods described above.

Note in FIG. 4B the obstacles 446*a*, 446*ba* are both cones. This, however, is an example only and is not intended to be limiting. In other environments, multiple obstacles may be present and each obstacle may be different.

Referring back to FIG. 3, once the lateral distance has been measured, block 306 includes comparing a lateral distance to a pre-determined threshold. The pre-determined threshold may be a threshold distance that is known to safely allow a vehicle, such as vehicle 404, to operate within a lane of travel. Example thresholds may include a width of a lane the vehicle is traveling in divided by two, or a width of the vehicle divided by two plus a pre-determined buffer. However, any threshold may be used that aids a vehicle in determining whether it can safely proceed avoiding any obstacles that may be present in the lane of travel of the vehicle. For example, referring to FIG. 4A, vehicle 404 may compare the lateral distance of cone 410 to half the distance of lane of travel 408*a* (shown as "threshold" in FIG. 4A). In this example, because the threshold is greater than the lateral distance, vehicle 404 may determine that road 402 is blocked or significantly shifted. In other words, because there is not enough lateral distance between cone 410 and center 412 to safely pass, vehicle 404 may determine that lane 408*a* is shifted or blocked.

Once the comparison has been made, the vehicle may be controlled based on the comparison, and at block 308, method 300 includes providing instructions to control the autonomous vehicle based on the comparison. For example, the vehicle may be controlled to safely navigate the lane of travel to safely pass any obstacles or to safely adjust to move past and within any present obstacles. For example, referring to FIG. 4A, vehicle 404 may determine that the lateral distance of cone 410 is less than the predetermined threshold. Under these circumstances, the vehicle may provide instructions to control the vehicle to stop operating in lane of travel 408*a*. The vehicle may, for example receive the instructions from computer system 112. Alternatively, if vehicle 404 determines that the lateral distance of cone 410 is greater than the pre-determined threshold, vehicle 404 may provide instructions to control the autonomous vehicle to continue operating in lane of travel 408*a*. Other instructions may be provided to vehicle 404 as well.

To distinguish between scenarios when a lane is shifted from when a lane is blocked, a vehicle may determine whether there are obstacles on both sides of the lane. If obstacles are not present on both sides of the lane, the vehicle may assume the lane is not being shifted. If obstacles are present on both sides of the lane, the vehicle may then determine whether the lane is shifted or blocked, which will be discussed in more detail with reference to method 320. For example, referring to FIG. 4A, vehicle 404 may determine there is only one obstacle on left side 414*a*. Since only cone 410 is on left side 414*a*, vehicle 404 may determine lane 408*a* is blocked because cone 410 has a lateral distance smaller than a safe threshold and only one obstacle is present in lane 408*a* on left side 414*a*.

Figure 4C:
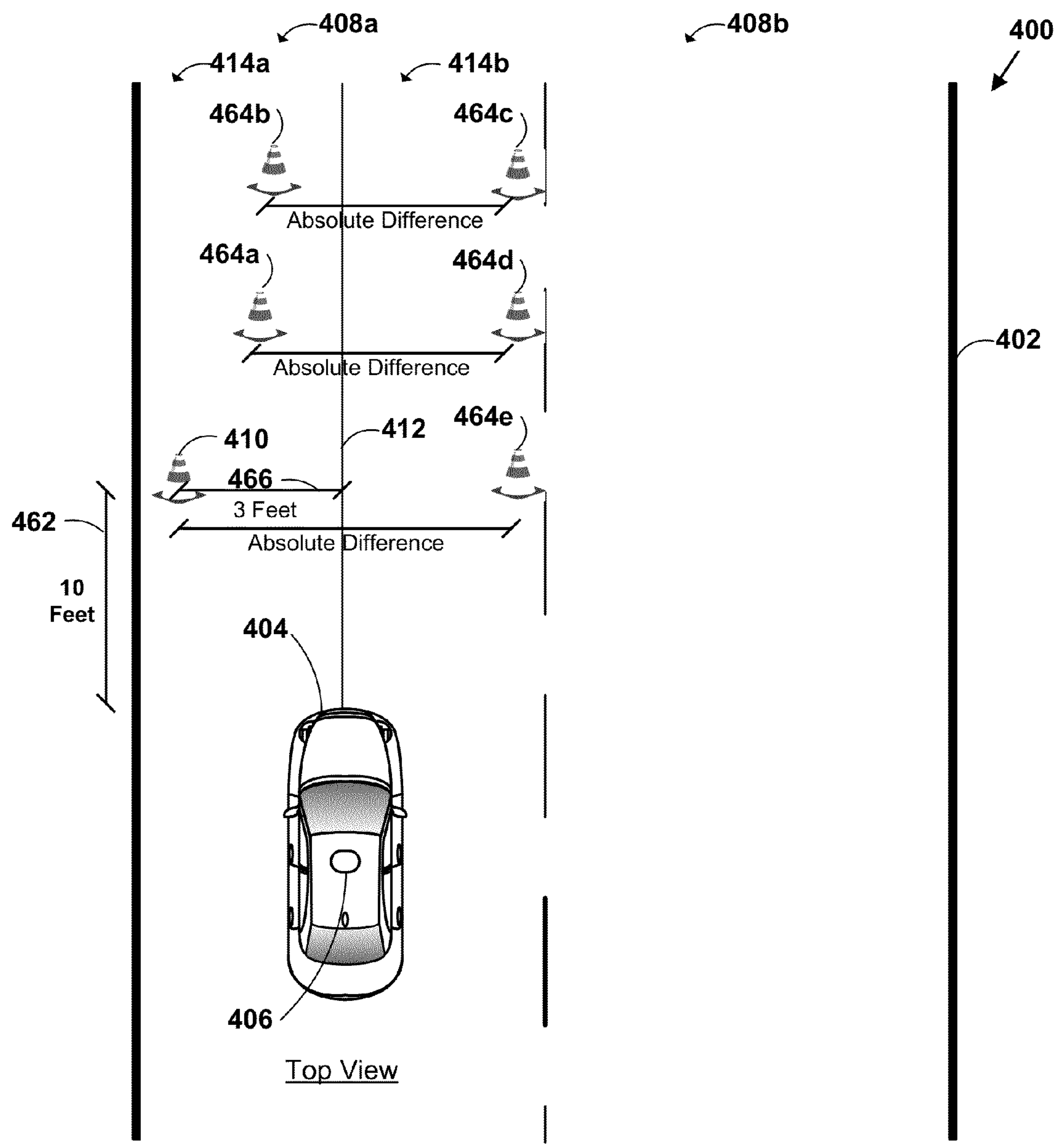
FIG. 4C is another top view of an autonomous vehicle operating scenario, in accordance with an example embodiment.

When multiple obstacles exist on both sides of a lane of travel, it may be necessary for the vehicle to determine whether the lane is shifted or blocked. FIG. 3B illustrates a method 320 for determining whether a lane of travel, such as lanes 408*a* and 408*b* depicted in FIGS. 4A-4C are shifted or blocked. At block 322, method 320 includes determining a presence of a second obstacle. The second obstacle may be an obstacle similar to or the same as the obstacle discussed above with regard to method 300, but may be different than the original obstacle. For example, as depicted in FIG. 4C, the second obstacle may be a second cone, but different than cone 410 depicted in FIG. 4A. The second obstacle may be substantially positioned on a second side of a lane of travel to that of the obstacle, and similar to the original obstacle, may be at a lateral distance from center 412. FIG. 4C illustrates an example operating scenario in environment 400, but at a different time. In FIG. 4C, multiple obstacles are present in lane of travel 408*a*. As shown, lane 408*a* includes cones 410, 464*a*, 464*b*, which are positioned substantially on left side 414*a* and cones 464*c*, 464*d*, 464*e*, which are positioned substantially on right side 414*b*.

Using the methods noted above with regard to method 300, vehicle 404 may process each obstacle to determine whether sufficient space remains for a driving lane, and at step 324, method 320 includes determining a lane constraint that defines an amount of space between the obstacle and the second obstacle. For example, vehicle 404 may determine a lane distance for each cone (as described above with reference to FIG. 4B), and order the lane distances in increasing order of the smallest lane distance to the largest lane distance. A set of pairs representing the lane distance and lateral distance (e.g., lane distance, lateral distance to obstacle) can then be created. The lateral distance may be determined in the manner described above with regard to method 300 at block 304. For example, the set representing cones 410, 464*a-e* may include six pairs. The first pair may represent the first cone 410 and include lane distance 462 and lateral distance 466 ("3 feet") to center 412 for cone 410.

At block 324, method 320 includes determining a lane constraint that defines an amount of space between the obstacle and the second obstacle. Using the set of pairs determined in the previous block, vehicle 404 may use computer system 112 to process each pair and estimate whether there is sufficient space for a driving lane, given constraints imposed by the obstacles as determined by the pairs. Initially, there are no obstacle constraints and so the left and right extents of the lane may be [infinity, −infinity] or some other place holding values. When a pair is encountered (i.e., [closest lane distance, lateral distance to obstacle]), vehicle 404 may update an appropriate left or right lane extent constraint based on which side of the lane the obstacle is closest to. For example, if the first pair in the set is (10, 3), representing cone 410 at lane distance 462 (e.g., 10 feet) with a lateral distance 466 (e.g., 3 feet), then vehicle 404 may update the left constraint to be 3 producing a new constraint of [3, −infinity]. If the second pair in the set is (12, −1.75) representing cone 464*d* (at a lane distance of 12 feet with a lateral distance of 1.75 feet (not shown)) the right constraint would be updated to −1.75 producing a constraint of [3,−1.75]. This process may be continued until all of the pairs in the set are processed, and based on this processing the lane constraint may be determined by continuously calculating an absolute difference between the left and right constraints. Using the provided example constraint, the lane constraint may be determined as the absolute difference between 3 and −1.75, resulting in 4.75 feet.

Block 326 of method 320 includes making a second comparison to the pre-determined threshold. The comparison may be made in a manner similar to or the same as that discussed above with regard to method 300.

Based on the comparison, at block 328, method 320 includes providing instructions to control the autonomous vehicle based on the second comparison. For example, based on the lane constraint being less than the pre-determined threshold or the second lateral distance being less than the pre-determined threshold, vehicle 404 may provide instructions to control the vehicle to stop operating in the lane of travel. Alternatively, based on the lane constraint being greater than the pre-determined threshold, vehicle 404 may provide instructions to control the autonomous vehicle to continue operating in the lane of travel in a manner that allows the autonomous vehicle to travel in between and past the obstacle and the second obstacle. In FIG. 4C, for example, environment 400 may have changed to shift lane 408*a* using cones 410, 464*a-e*, and vehicle 404 may receive instructions to re-direct its heading to safely operate past and through cones 410, 464*a-e* thereby following the lane shift.

Note that while FIG. 4C illustrates cone 410, 410*a*, and 410*b* substantially positioned in left side 414*a* of lane 408*a* and positioned across from cone 410*e*, 410*d*, and 410*c* respectively, obstacles may be positioned in different manners as well. In some embodiments there may not be an equal number of obstacles on each side of the lane of travel. Moreover, obstacles positioned on opposite sides may not be positioned directly across from each other as depicted in FIG. 4C.

Moreover, although the cones 464*c*, 464*d*, 464*e* illustrated in the operating scenario of FIG. 4C are positioned within left side 414*b* of lane 408*a*, in other scenarios cones 464*c*, 464*d*, 464*e* may be substantially positioned outside of lane 408*a* (e.g., positioned in lane 408*b*) such as for example, scenarios in which lane 408*a* is shifted in its entirety (i.e., the lane is shifted while maintaining the same lane width). In such an example, vehicle 404 may still determine whether lane 408*a* has been shifted in the same manner as noted above.

Example methods, such as method 300 of FIG. 3A or method 320 of FIG. 3B may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
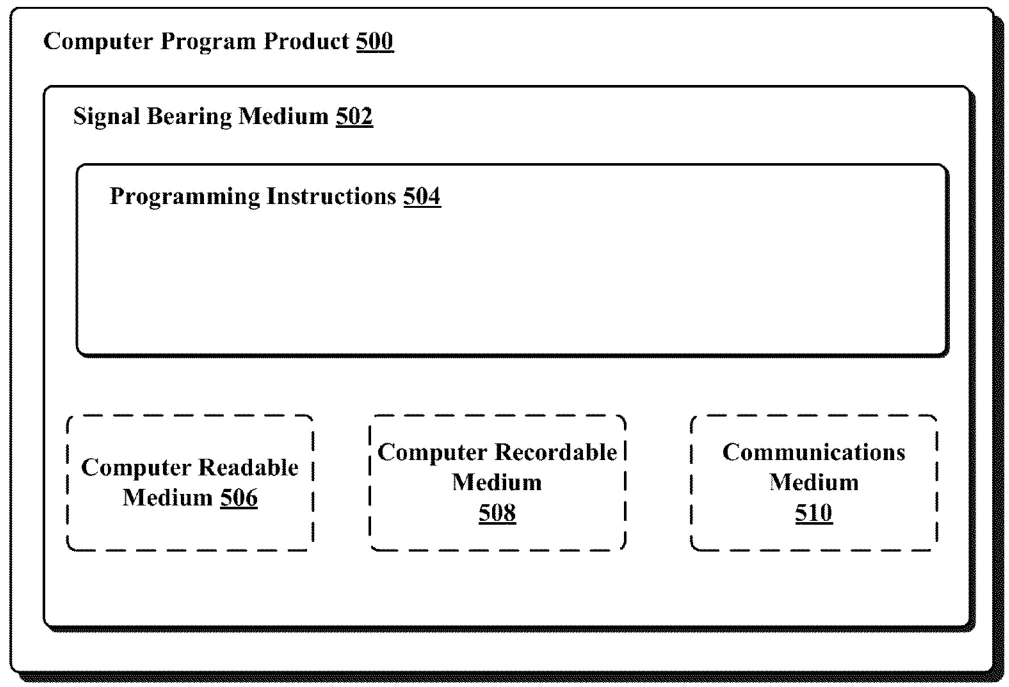
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

I claim:

1. A method comprising:

determining, using at least one sensor of an autonomous vehicle, a presence of an obstacle substantially positioned in a lane of travel of the autonomous vehicle, wherein the lane of travel has a first side, a second side, and a center, and wherein the obstacle is substantially positioned on the first side;

determining, using a processor, a lateral distance between the obstacle and the center;

comparing the lateral distance to a pre-determined threshold; and providing instructions to control the autonomous vehicle based on the comparison.

2. The method of claim 1, wherein providing instructions to control the autonomous vehicle based on the comparison comprises based on the lateral distance being greater than the pre-determined threshold, providing instructions to control the autonomous vehicle to continue operating in the lane of travel.

3. The method of claim 1, wherein providing instructions to control the autonomous vehicle based on the comparison comprises based on the lateral distance being less than the pre-determined threshold, providing instructions to control the autonomous vehicle to adjust operating in the lane of travel.

4. The method of claim 1, wherein providing instructions to control the autonomous vehicle based on the comparison comprises based on the lateral distance being less than the pre-determined threshold:

determining, using the at least one sensor, a presence of a second obstacle, wherein the second obstacle is substantially positioned on the second side, wherein the second obstacle is different than the obstacle, and wherein the second obstacle is at a second lateral distance to the center;

determining, based on the lateral distance and the second lateral distance, a lane constraint that defines an amount of space between the obstacle and the second obstacle;

making a second comparison, using the processor, of the lane constraint to the pre-determined threshold; and providing instructions to control the autonomous vehicle based on the second comparison.

5. The method of claim 4, further comprising based on the lane constraint being greater than the pre-determined threshold and the second lateral distance being greater than the pre-determined threshold, providing instructions to control the autonomous vehicle to continue operating in the lane of travel in a manner that allows the autonomous vehicle to travel between and past the obstacle and the second obstacle.

6. The method of claim 4, further comprising based on the lane constraint being less than the pre-determined threshold or the second lateral distance being less than the pre-determined threshold, providing instructions to control the autonomous vehicle to adjust operating in the lane of travel.

7. The method of claim 4, further comprising determining the lane constraint based on an absolute value of a difference between the lateral distance and the second lateral distance.

8. The method of claim 1, wherein the first side comprises a left side of the autonomous vehicle and the second side comprises a right side of the autonomous vehicle.

9. The method of claim 1, further comprising determining the pre-determined threshold based on a width of the autonomous vehicle.

10. The method of claim 1, further comprising determining the pre-determined threshold based on a width of the lane of travel.

11. A vehicle comprising:

a sensor configured to determine a presence of an obstacle substantially positioned in a lane of travel of the vehicle, wherein the vehicle is configured to operate in an autonomous mode in the lane of travel, wherein the lane of travel has a first side, a second side, and a center, and wherein the obstacle is substantially positioned on the first side; and a computer system, wherein the computer system is configured to:

determine a lateral distance between the obstacle and the center;

compare the lateral distance to a pre-determined threshold; and provide instructions to control the vehicle based on the comparison.

12. The vehicle of claim 11, wherein the computer system is further configured to provide instructions to control the vehicle to continue operating in the lane of travel.

13. The vehicle of claim 11, wherein the computer system is further configured to provide instructions to control the vehicle to adjust operating in the lane of travel.

14. The vehicle of claim 11, wherein the computer system is further configured to based on the lateral distance being less than the pre-determined threshold:

determine, using the at least one sensor, a presence of a second obstacle, wherein the second obstacle is substantially positioned on the second side, wherein the second obstacle is different than the obstacle, and wherein the second obstacle is at a second lateral distance to the center;

determine, based on the lateral distance and the second lateral distance, a lane constraint that defines an amount of space between the obstacle and the second obstacle;

making a second comparison, using the processor, of the lane constraint to the pre-determined threshold; and provide instructions to control the autonomous vehicle based on the second comparison.

15. The vehicle of claim 14, wherein the computer system is further configured to based on the lane constraint being greater than the pre-determined threshold and the second lateral distance being greater than the pre-determined threshold, provide instructions to control the autonomous vehicle to continue operating in the lane of travel in a manner that allows the autonomous vehicle to travel between and past the obstacle and the second obstacle.

16. The vehicle of claim 14, wherein the computer system is further configured to based on the lane constraint being less than the pre-determined threshold or the second lateral distance being less than the pre-determined threshold, provide instructions to control the autonomous vehicle to adjust operating in the lane of travel.

17. The method of claim 14, further comprising determining the lane constraint based on calculating an absolute value of a difference between the lateral distance and the second lateral distance.

18. A non-transitory computer readable medium having stored therein instructions, that when executed by a computer system in an autonomous vehicle, cause the computer system to perform functions comprising:

determining, using at least one sensor of the autonomous vehicle, a presence of an obstacle substantially positioned in a lane of travel of the autonomous vehicle, wherein the lane of travel has a first side, a second side, and a center, and wherein the obstacle is substantially positioned on the first side;

determining, using a processor, a lateral distance between the obstacle and the center;

comparing the lateral distance to a pre-determined threshold; and providing instructions to control the autonomous vehicle based on the comparison.

19. The non-transitory computer readable medium of claim 18, wherein the instructions are further executable by the computer system to perform functions comprising:

based on the lateral distance being greater than the pre-determined threshold, providing instructions to control the autonomous vehicle to continue operating in the lane of travel; and based on the lateral distance being less than the pre-determined threshold, providing instructions to control the autonomous vehicle to adjust operating in the lane of travel.

20. The non-transitory computer readable medium of claim 18, wherein the instructions are further executable by the computer system to perform functions comprising based on the lateral distance being less than the pre-determined threshold:

determining, using the at least one sensor, a presence of a second obstacle, wherein the second obstacle is substantially positioned on the second side, wherein the second obstacle is different than the obstacle, and wherein the second obstacle is at a second lateral distance to the center;

determining, based on the lateral distance and the second lateral distance, a lane constraint that defines an amount of space between the obstacle and the second obstacle;

making a second comparison, using the processor, of the lane constraint to the pre-determined threshold; and providing instructions to control the autonomous vehicle based on the second comparison.

* * * * *